United States Patent [19]

Kataoka

[11] Patent Number: 4,560,475

[45] Date of Patent: Dec. 24, 1985

[54] FILTER ASSEMBLY WITH SUPPORTING EDGES

[75] Inventor: Joji Kataoka, Tokyo, Japan

[73] Assignee: Kataoka Bussan Kabushiki Kaisha, Tokyo, Japan

[21] Appl. No.: 563,375

[22] Filed: Dec. 20, 1983

Related U.S. Application Data

[63] Continuation of Ser. No. 328,512, Dec. 8, 1981, abandoned.

[30] Foreign Application Priority Data

| Dec. 27, 1980 | [JP] | Japan | 55-185091 |
|---|---|---|---|
| Mar. 7, 1981 | [JP] | Japan | 56-031751 |
| Mar. 24, 1981 | [JP] | Japan | 56-040286 |
| Apr. 16, 1981 | [JP] | Japan | 56-053789 |
| Jul. 25, 1981 | [JP] | Japan | 56-109796 |
| Aug. 12, 1981 | [JP] | Japan | 56-118711 |
| Aug. 12, 1981 | [JP] | Japan | 56-118712 |
| Aug. 14, 1981 | [JP] | Japan | 56-119955 |
| Sep. 3, 1981 | [JP] | Japan | 56-130371 |

[51] Int. Cl.⁴ .................................... B01D 23/28
[52] U.S. Cl. ............................. 210/249; 210/455; 210/469; 210/474; 99/323; 99/323.3
[58] Field of Search ............... 210/249, 250, 238, 469, 210/455, 474, 478, 475, 479, 480, 481, 473, 476, 482, 497.2, 493.5; 99/306, 323, 323.3, 295; 426/77, 82; 55/376, 377; 206/0.5, 216; D9/439, 434, 433; D7/47, 400, 399; 248/94

[56] References Cited

U.S. PATENT DOCUMENTS

| 752,019 | 2/1904 | Adwen | 210/474 |
|---|---|---|---|
| 2,835,191 | 5/1958 | Clurman | 210/474 |
| 2,896,788 | 7/1959 | Hoffberger | 210/273 |
| 3,166,003 | 1/1965 | Merson | 99/306 |
| 3,215,060 | 11/1965 | Perlov | 99/306 |
| 3,334,574 | 8/1967 | Douglas | 99/304 |
| 3,344,734 | 10/1967 | Aguirre Batres et al. | 99/304 |
| 3,615,708 | 10/1971 | Abile-Gal | 99/295 |
| 3,861,975 | 1/1975 | Hauslein | 210/474 |
| 3,971,305 | 7/1976 | Daswick | 99/295 |
| 4,220,541 | 9/1980 | Chang | 210/474 |

FOREIGN PATENT DOCUMENTS

| 2657498 | 6/1978 | Fed. Rep. of Germany | 99/306 |
|---|---|---|---|
| 2738969 | 3/1979 | Fed. Rep. of Germany | 426/77 |
| 406264 | 4/1979 | Sweden | . |
| 2091541 | 8/1982 | United Kingdom | 99/295 |

Primary Examiner—Richard V. Fisher
Assistant Examiner—Wanda L. Millard

[57] ABSTRACT

A filter assembly for providing a filtrate such as coffee has a sack of filter paper adhered to the back of a foldable support plate. The support plate is constituted by an intermediate portion with an opening for pouring hot water therethrough, which is covered by the filter sack, and a pair of support legs connected with the opposite sides of the intermediate portion to have the latter therebetween. Each support leg is formed with at least one slot which extends symmetrically with respect to the longitudinal centerline of the support plate to define a plurality of coactive locking members, which are firmly engagable with a receptacle to support the filter assembly upright stably thereon when the support legs are folded relative to the intermediate portion along preselected fold lines. The locking members may be defined by a pair of slots or a single generally U-shaped slot at each support leg, for example.

15 Claims, 30 Drawing Figures

FILTER ASSEMBLY WITH SUPPORTING EDGES

This is a continuation of application Ser. No. 328,512, filed Dec. 8, 1981, now abandoned.

BACKGROUND OF THE INVENTION

The present invention relates to a filter assembly adapted to provide liquid coffee or like filterate and which is storable in a folded compact size, easy to use and economical.

While various methods are available today for preparing coffee, for example, dripping is generally accepted as comparatively simple and convenient method. For the drip type method, use is extensively made of a dripper in the form of a piece of cloth, plastics or ceramics though requiring some troublesome work for cleaning it after the use or for the storage. There have been proposed filters formed of paper sheets or plastic films which are not costly and relatively easy to handle.

One of such a type of filters is disclosed in Japanese Utility Model Publication No. 52-2703/1977. This filter comprises a support plate which is formed with an opening in its intermediate portion and foldable support pieces in its laterally opposite portions. The support pieces adjoin the rest of the support plate through fold lines, respectively. Lugs extend outward from the ends of the individual support pieces. A sack of filter paper is adhered along its peripheral edge portion to the back of the support plate to surround the opening. The support pieces are folded along the fold lines and then set upright on the upper edge of a cup or like receptacle by engaging the lugs with the receptacle. However, the filter is merely laid on the receptacle and, therefore, unstable due to the simple engagement of the lugs with the receptacle. The filter tends to fall down or have the support pieces disengaged from the edge of the receptacle when hot water is being poured into the filter due to the weight of the hot water. Thus folded into the upright position, the support legs constantly tend to restore its flat non-folded position moving outward away from each other. This brings about another problem that the support provided by the lugs is too weak to eliminate the need for cares during framing of such a filter assembly.

SUMMARY OF THE INVENTION

It is an object of the present invention to provide a filter assembly which can stably stand upright on a cup or like receptacle firmly engaged with the latter and can be readily framed to such an upright position to promote the ease of handling.

In order to achieve this object, a filter assembly embodying the present invention comprises a support plate which has an intermediate portion to define an opening for pouring hot water therethrough and a pair of support legs which connect to the opposite sides of the intermediate portion, respectively, and a sack of filter paper which covers the opening in the support plate. More specifically, a characteristic feature of the filter assembly of the invention resides in that each of the support legs on the opposite sides of the intermediate portion is formed with at least one cut or slot which is shaped symmetrically with respect to the longitudinal centerline of the support plate and defines a plurality of locking or nipping members.

The plurality of nipping members may comprise an inner nipping member and pair of outer nipping members which are defined by a pair of slots each of which terminates at an edge of a corresponding support leg. Alternatively, each support leg may be formed with a generally U-shaped slot spaced a certain distance from its edge such that the slot defines a tongue-shaped inner nipping member at its inboard edge and an outer nipping strip at its outboard edge. In either case, the filter assembly can be maintained in a stable raised position merely by attaching the inner and outer nipping members to a cup or like receptacle. The nipping members are prevented from collapsing or separating from the receptacle when hot water is poured into the filter assembly in use, or from slipping into the receptacle even when pressed a little from above.

The opening in the intermediate portion of the support plate may be formed at the production stages of the filter assembly. Alternatively, where the filter sack is filled with a coffee powder and the filter assembly with such a filter sack is hermetically sealed in a wrapper with the open end of the sack left unsealed, the intermediate portion of the support plate may be discontinuously slitted to define a removable lid which is to define the opening when removed.

Other objects, together with the foregoing, are attained in the embodiments described in the following description and illustrated in the accompanying drawings.

DESCRIPTION OF THE PREFERRED EMBODIMENTS

Figure 1:
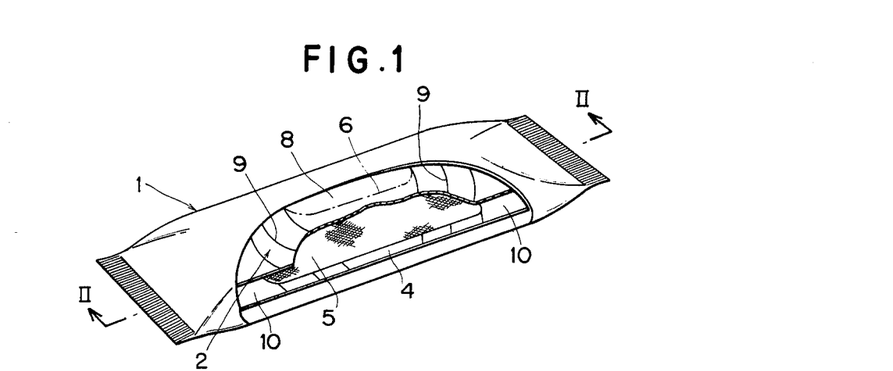
FIG. 1 is a partly broken away perspective view of a coffee package using a filter assembly of the present invention, the filter assembly being shown in a folded position.
Figure 2:
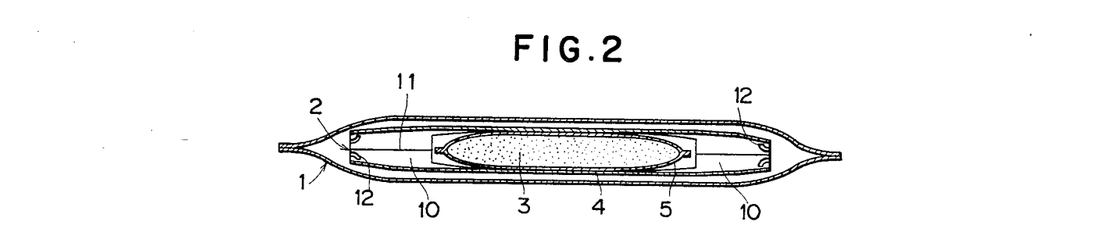
FIG. 2 is a section taken along line II—II of FIG. 1.
Figure 3:
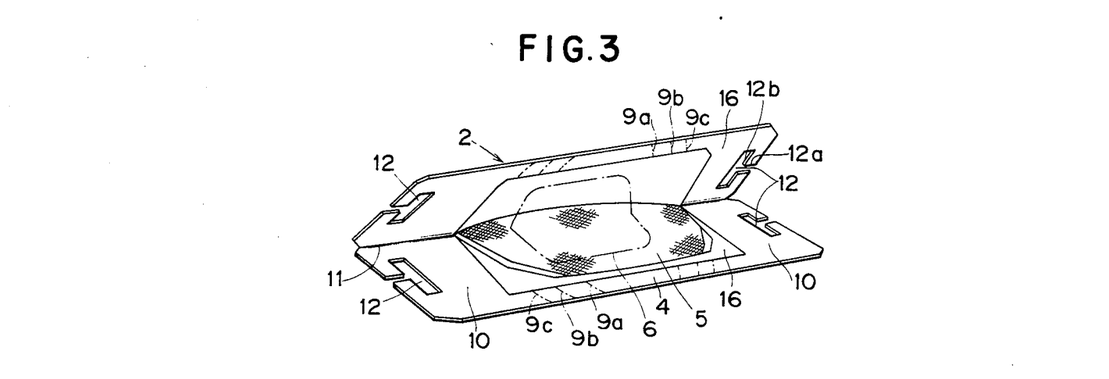
FIG. 3 is a perspective view of a filter assembly embodying the present invention which is in a half-folded position.
Figure 4:
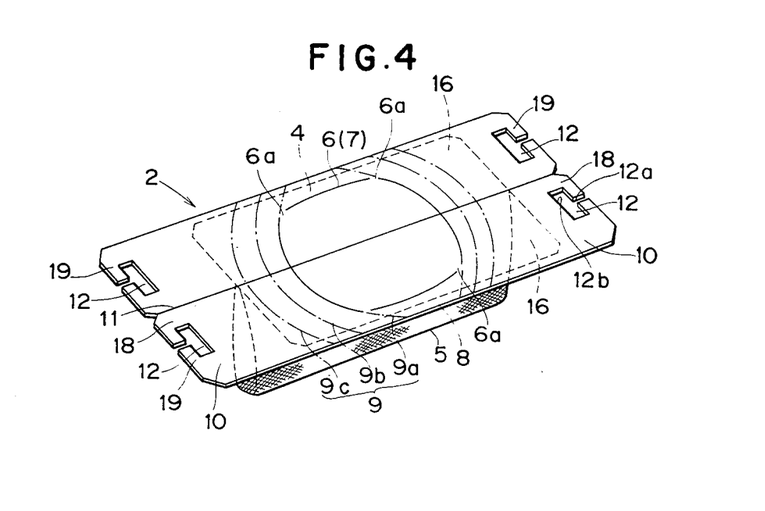
FIG. 4 is a perspective view of the filter assembly shown in FIG. 3.

Referring to FIGS. 1-5, a filter assembly of the present invention is shown which is applied to a package of coffee or the like for functioning to store a coffee powder as well as to provide a filtrate. The coffee package is generally made up of a wrapper 1 and a filter assembly 2 of the present invention which is hermetically enveloped in the wrapper 1 together with a weighed volume of coffee powder 3. The filter assembly 2 comprises a support or base plate 4 which is an approximately rectangular piece cut from a sheet having a desired rigidity, e.g. a thick paper sheet or a sheet of plastics. A sack of filter paper 5 made of viscose, for example, is carried on the back of the support plate 4 by adhesion. As best shown in FIG. 4, the support plate 4 has in its intermediate portion a generally circular removable lid 8 which is defined by discontinuous cuts or slits 6. The lid 8 is integral with the rest of the support plate 4 through non-slitted portions 6a. When removed, the lid 8 will leave a generally circular opening or mouth 7 as will be described. A plurality of parallel fold lines are formed at each side of the lid 8 in symmetric relation with those at the other side. The fold lines 9 at the opposite sides of the lid 8 define opposite side edge portions of the support plate 4 in cooperation with the corresponding ends of the latter. A pair of symmetrically shaped support legs 10 are formed in these edge portions of the support plate 4, respectively. If desired, the opening 7 may be formed in the support plate 4 in the production stages of the filter assembly and provided with a square or polygonal contour. Triangular and other openings unsuitable for pouring hot water should not be employed.

Figure 28:
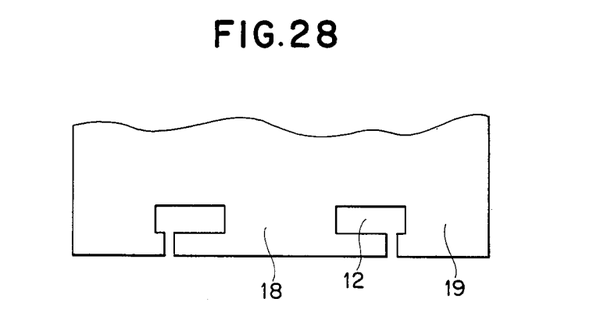
FIGS. 28-30 are fragmentary plan views of support plates formed with slots which are diffferent from those shown in FIGS. 3-5, respectively.
Figure 29:
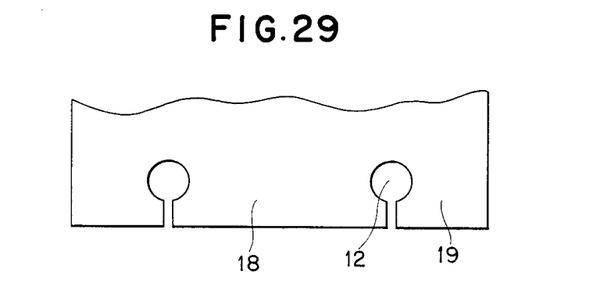
Figure 30:
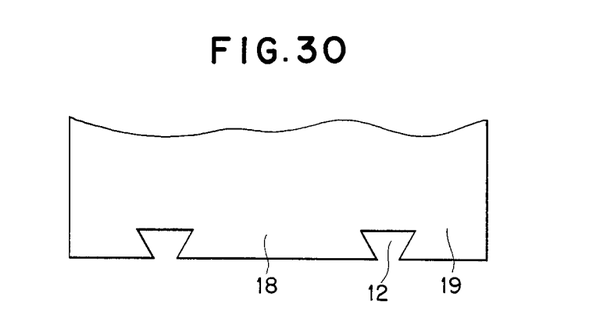

The support plate 4 with the lid 8 and leg pair 10 is foldable into two along the longitudinal centerline 11 thereof. Each support leg 10 is formed with generally T-shaped slots 12 in positions which are symmetric to each other with respect to the centerline 11. These slots 12 serve their specific function when the filter assembly is placed on the cup or like receptacle as will be described. Each of the T-shaped slots 12 is made up of a slit 12a extending inward from the corresponding edge of the leg 10 and a generally rectangular opening 12b at substantially the center of which the slit 12a terminates; the opening 12b is elongate in a direction perpendicular to the slit 12a and parallel to the edge. It will be noted that, instead of the T-shape, the slot 12 may have any other shape which connects to the edge through a relatively small width and has a relatively wide inboard edge, e.g. an L-shape (see FIG. 28), a keyhole shape (see FIG. 29) or a trapezoid (see FIG. 30).

Figure 5:
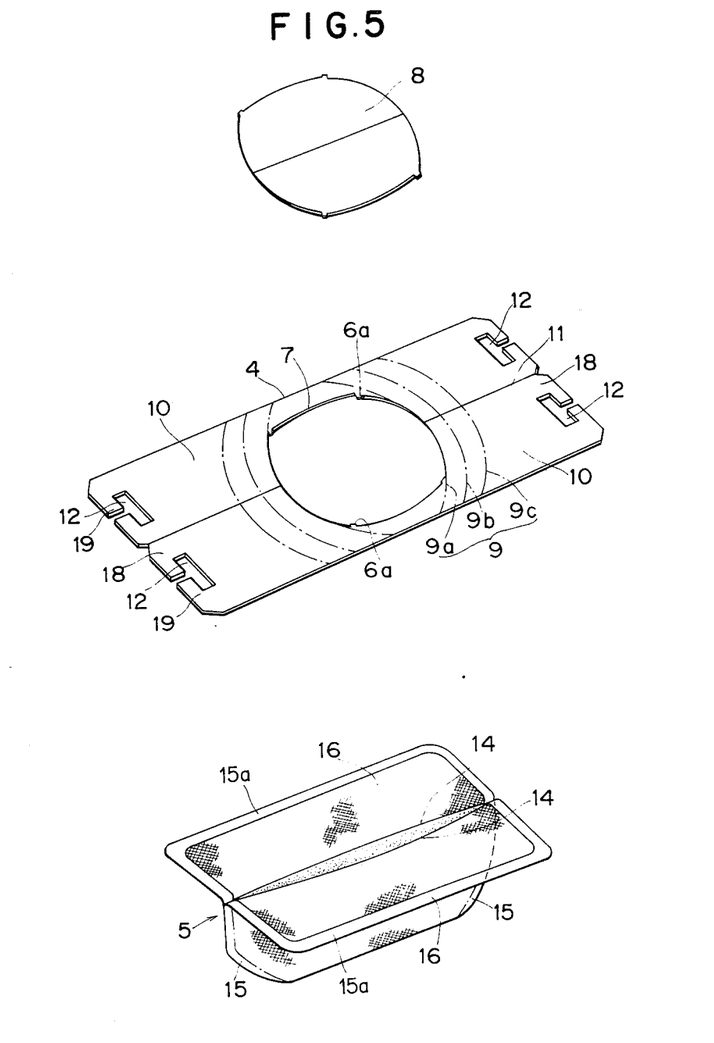
FIG. 5 is an exploded perspective view of the filter assembly shown in FIG. 3.
Figure 6:
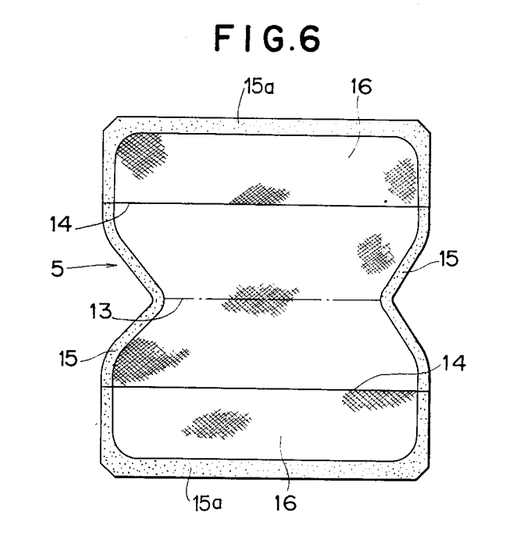
FIG. 6 is a developed view of a filter sack which forms a part of a filter assembly according to the invention.

The paper filter 5 is formed as a flat sack for filtering the coffee powder 5 stored therein. As shown in FIG. 6, the filter sack 5 according to this embodiment is prepared by cutting a generally rectangular piece from filter paper, folding the cut piece along its central axis line 13, applying an adhesive to opposite lateral edges 15 between the central axis line 13 and cross lines 14 substantially intermediate between the axis line 13 and upper and lower ends of the cut piece, and sticking the folded parts together along the edges 15. The sack is thus open at its upper end along the intermediate axis. Flaps 16 extending outward from the individual intermediate axis lines 14 are laid on the back of the support plate 4 and individually adhered thereto along their peripheral edges 15a. This completes the integral assembly of the filter sack 5 with the support plate 4. In a normal situation, the filter sack 5 is attached to the underside of the support plate 4 as seen in FIG. 5 with the opposite edges of its opening held in parallel contact to close the opening. The lateral dimension of this open end of the filter sack is preselected to be greater than the spacing between the fold lines 9 on the support plate 4. Also, the facing edges of the flaps 16 are spaced from each other by a distance which is larger than the diameter of the lid 8 of the support plate 4. The filter sack 5 thus calibrated is adhered to the back of the support plate 4 such that the cross lines 14 defining the edges of the open end are aligned with the longitudinal centerline 11 of the support plate 4 while the open end of the sack is located just beneath the lid 8 along the centerline 11. When the flaps 16 are adhered to the support plate 4, the open end of the sack will become stopped up by the lid 8 and its neighborhood on the support plate 4.

When applied to a package of coffee or the like as in this embodiment, the filter sack 5 is filled with a predetermined volume of coffee powder 3 before bonded to the support plate 4. Bonding the filter sack 5 to the support plate 4 confined the coffee powder 5 within the sack.

The filter assembly thus constructed is enveloped in the wrapper with the coffee powder 3 confined in the filter sack 5. In this embodiment, the filter assembly 2 is enveloped in the wrapper 1 holding the filter sack 5 along the centerline 11 with the powder 3 stored inside the double folded support plate 4. Subsequently, the interior of the wrapper 1 is evacuated or filled with an inert gas after evacuation to seal the filter assembly 2 air-tight therein.

Though the filter assembly of the present invention has been shown and described as being enveloped in a wrapper with a coffee powder stored therein, it will be apparent that a desired volume of coffee powder may be put into the filter sack at a time of use.

Figure 7:
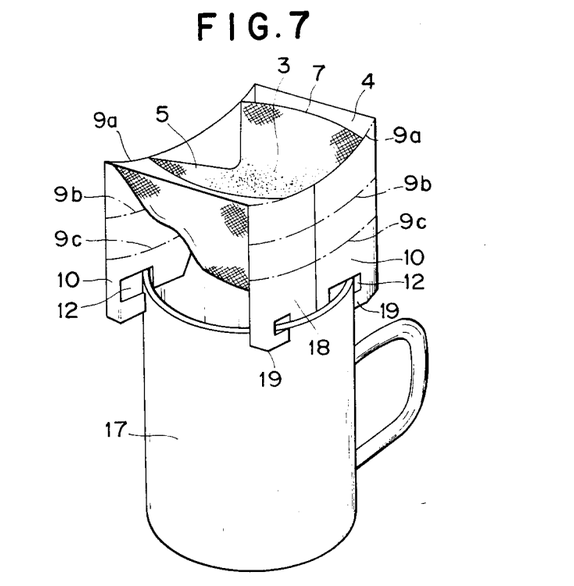
FIGS. 7-9 are perspective views showing various ways in which the filter assembly of FIG. 3 is used.
Figure 8:
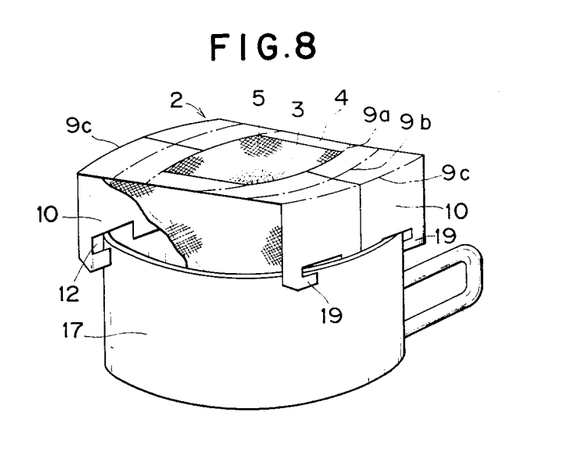
Figure 9:
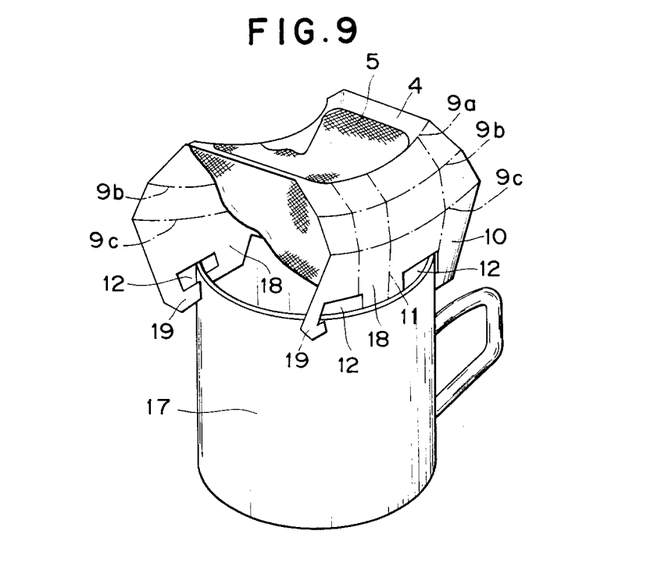

FIGS. 7-9 show various ways in which the coffee package can be used by way of example. First, the wrapper 1 is unsealed and the filter assembly 2 is taken out. The support plate 4 of the filter assembly 2 is developed flat as viewed in FIG. 4 whereupon the non-slitted portions 6a are cut or broken to remove the lid 8 and thereby open the mouth 14 of the filter sack 5. Then, the support legs 10 on the support plate 4 are bent downwardly substantially perpendicularly to the rest of the support plate 4 by folding them along the desired pair of fold lines 9. Under this condition, the support plate 4 is caused to stand on the edge of a cup 17 through the slots 12 in the legs 10, followed by pouring hot water into the filter assembly 2.

It will be seen from FIGS. 7-9 that the coffee package can accommodate various diameters of cups 17 due to the concentric fold lines 9 on the support plate 4. In FIG. 7, the legs 10 are bent along the innermost fold line pair 9a to match with a relatively small diameter cup while, in FIG. 8, they are bent along the outermost fold line pair 9c to match with a relatively large diameter cup. When none of the fold lines 9 conforms to the diameter of a cup, each leg 10 will be curved as shown in FIG. 9 by folding the support plate 4 along the innermost fold line 9a, and then slightly folding the intermediate and outermost fold lines 9b and 9c to a specific curvature appropriate for the cup diameter. This will prove particularly effectively if the upper edge of the cup is flared outwardly as seen in FIG. 9. The thus framed support plate 4 is securely placed on the edge of the cup 17 utilizing the slots 12 in the legs 10. An inboard nipping finger 18 of each leg 10 is inserted into the cup 17 while outboard nipping fingers 19 are positioned outside the cup 17, holding the cup edge positively from both sides thereof.

In accordance with the present invention, when the receptacle has an outwardly flared upper edge, such an edge will protrude outward through the slots 12 while the outer nipping fingers 19 will become situated below the edge of the receptacle to face the inner nipping fingers 18. This ensures further stable engagement of the filter assembly with the receptacle.

Since the fold lines 9 in this embodiment are formed arcuately, bending the legs 10 upright automatically bends the support plate with a rigidity great enough to support the entire assembly. Meanwhile, since the opposite ends of the filter sack 5 are adhered to the support plate 4 over to its support legs 10, such framing of the support plate 4 brings the opposite ends of the filter sack 5 toward each other due to the deformation of the support plate so that the upper end of the filter sack 5 is automatically opened to promote easy pouring of hot water. As will be noted, the fold lines 9 may be in the form of straight lines extending perpendicular to the longitudinal centerline 11 or polygonally extending lines.

Thus, the filter assembly 2 can be framed and set upright on a cup by simple manipulation and liquid coffee can be received automatically by the cup simply by pouring hot water thereinto. This promotes quite easy handling of the filter assembly 2. The framed filter assembly 2 stands upright on a cup so that one can see the filter sack 5 and the interior of the cup from between the support legs 10 to check the state of extraction of the liquid.

Figure 10:
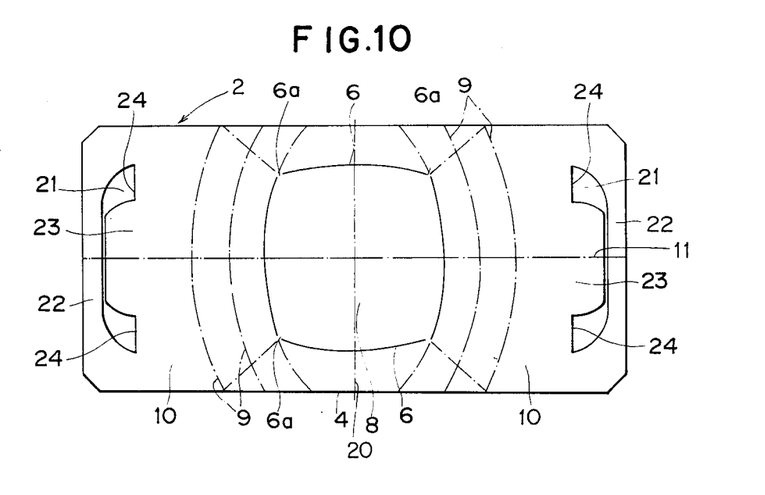
FIGS. 10-12 are plan views of other embodiments of the present invention, respectively.
Figure 11:
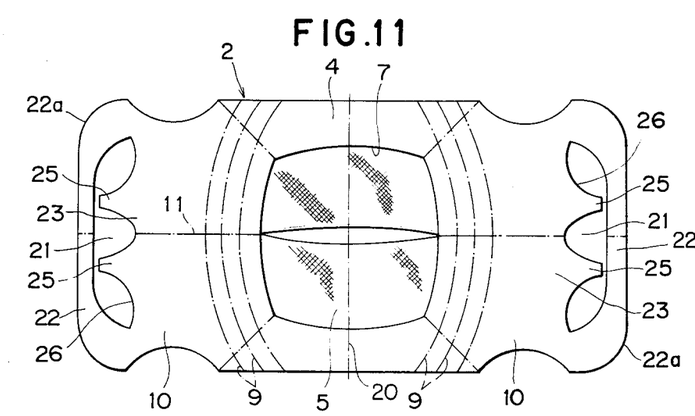
Figure 12:
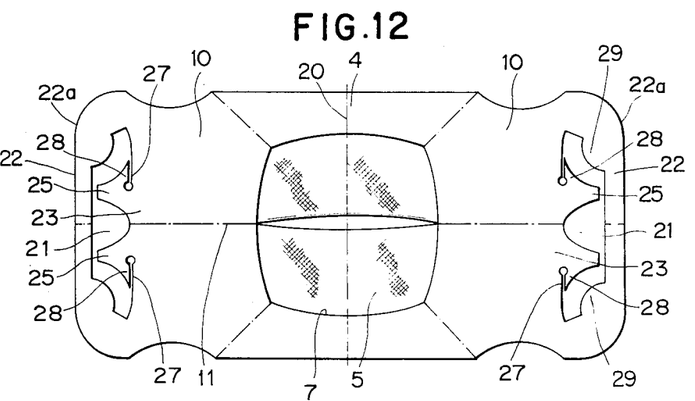

Referring to FIGS. 10-12, there are shown other examples of the nipping portions which are located adjacent to the opposite ends of the filter assembly. In FIG. 10, each support leg 10 of the support plate is formed with a generally U-shaped cut or slot 21 which is positioned adjacent to but spaced from the edge of the support leg. The slot 21 is shaped symmetrically with respect to the longitudinal centerline 11 of the support plate 4. In each support leg 10, the slot 21 defines an inner nipping tongue 23 at its inboard edge and an outer nipping strip 22 at its outboard edge. The slot 21 in the opposite support legs 10 are symmetric to each other with respect to the transverse centerline 20 of the support plate 4. The filter assembly of FIG. 10 can be fixed on a receptacle positively yet with one hand manipulation merely by positioning the outer nipping strips 22 in contact with the outer edge surface of the receptacle and thrusting the inner nipping tongues 23 inward to allow the opposite edges 24 of each slot 21 to rest on the receptacle. In the case of a receptacle having an outwardly flared upper edge, the outer nipping strips 22 will cooperate with the inner nipping tongues 23 in surely nipping the receptacle in the manner described with reference to FIGS. 3-9.

A modification to the support plate 4 of FIG. 10 is illustrated in FIG. 11 in which the support plate 4 is formed with the opening 7 in the production stages of the filter assembly. In FIG. 11 the inner nipping member 23 formed by the generally U-shaped slot which is perpendicular to the longitudinal centerline 11 of the support plate is additionally notched at its intermediate portion to define a generally E-shaped slot 21. Such a shape of the slot 21 provides an outer locking or nipping strip 22 adjacent to the edge of the support leg 10 and a pair of lugs 25 which protrude outward from the inboard edge 26 of the slot 21 to face the outer nipping strip 22. The lugs 25 in the inner nipping tongue 23 are symmetric to each other with respect to the longitudinal centerline 11 of the support plate 4. With this structure, the filter assembly 2 will be firmly supported at three points in each of the support legs 10 when mounted on a receptacle: two at the lugs 25 engagable with the inner surface of the receptacle and one at the outer nipping strip 22 intimately engagable with the outer surface of the receptacle along the curvature in such a manner as to embrace it from outside. This ensures far more stable upright position of the filter assembly on a receptacle. The engagement achievable with this structure remains stable hardly affected by a change in diameter of a receptacle.

FIG. 12 shows a modified version of the nipping members of the support legs indicated in FIG. 11. In FIG. 12, cuts 27 extend toward each other from outboard base ends of the lugs 25 at each inner nipping tongue 23 to define small elastic pieces 28. These cuts 27 render the lugs 25 at the inner nipping tongue 23 readily flexible to become compatible even with receptacles of relatively small diameters.

Additionally, each outer nipping strip 22 in FIG. 12 includes a pair of small projections 29 which bulge from opposite ends of the nipping strip 22 to face the inner nipping member 23. Consequently, the inner and outer nipping members at each support leg 10 support the filter assembly at four points on a receptacle, which is superior in nipping strength to the three-points support of FIG. 11. It will be apparent that such small projections 29 are applicable also to the configuration shown in FIG. 10 or 11.

Figure 13:
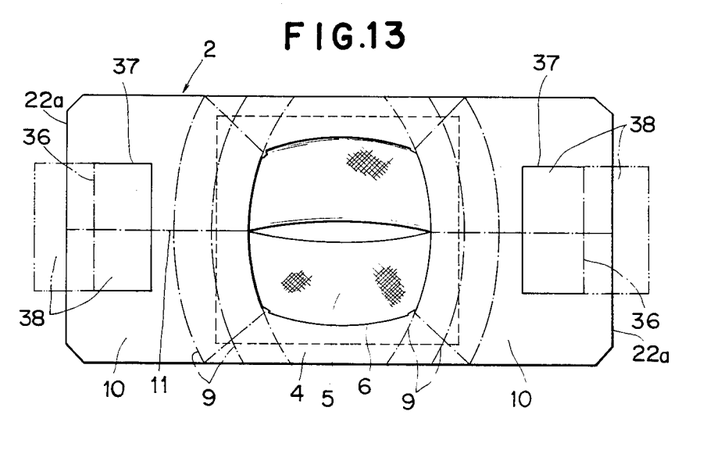
FIG. 13 is a plan view of still another embodiment of the present invention.
Figure 14:
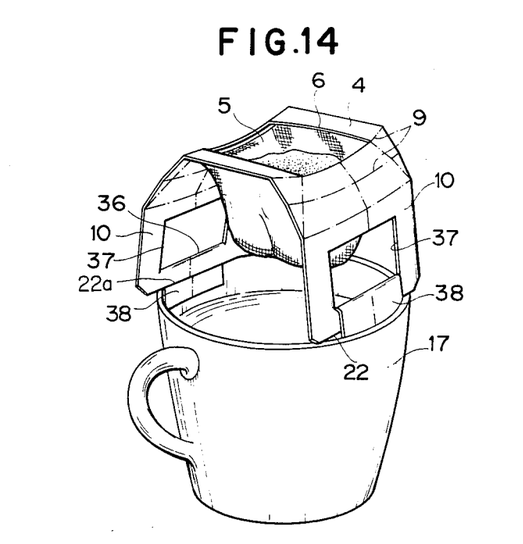
FIG. 14 is a perspective view showing the filter assembly of FIG. 13 in use.

In FIGS. 13 and 14, each support leg 10 is provided with a fold line 36 in parallel with its edge 22a. It is also provided with a generally U-shaped cut or slit 37 which connects to the opposite ends of the fold line 36 such that the bottom of "U" is remote from the leg edge. The slit 37 forms an inner nipping member or tongue 38 which can be raised relative to the rest of the leg 10 as will be described. The distance between the fold line 36 and the confronting part of the slit 37 is selected to be larger than the distance between the fold line 36 and the leg edge 22a. This dimensional relation causes the free end of the tongue 38 to protrude outward beyond the edge 22a when turned over along the fold line 36 toward the edge 22a. The tongues 38 which are bent 180° outwardly along the fold lines 36 are allowed to pressingly engage with the receptacle due to their own returning forces and thereby ensure a stable support. The tongues 38 leave windows of complementary shapes in the associated support legs 10 when so turned over to their supporting positions. Hence, one can observe the varying liquid level in the receptacle 17 far more clearly through these windows.

Figure 15:
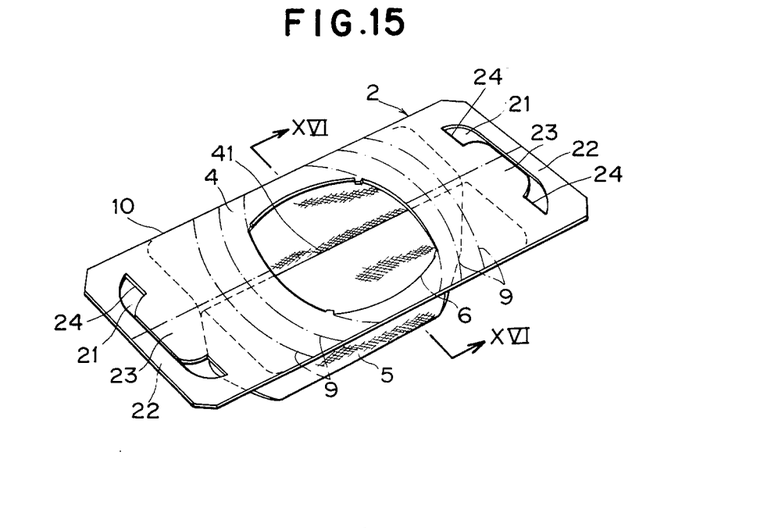
FIG. 15 is a perspective view of a filter assembly demonstrating one method of confining a coffee powder in a filter sack.
Figure 16:
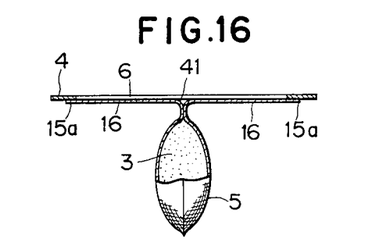
FIG. 16 is a section taken along line XVI—XVI of FIG. 15.

In FIGS. 15 and 16 filter sack 5 has flaps 16 which extend outward away from each other from opposite edges 41 of the open end of the filter sack 5. The filter sack 5 is securely connected to the support plate 4 by adhering the flaps 16 to the back of the support plate 4 along their peripheral edges 15a. At the edges 41, the filter sack 5 has its facing inner surfaces separably connected together as by adhering, pressing or heat-sealing them together in order to confine a predetermined volume of coffee powder or the like 3 thereinside.

In the embodiment of FIGS. 1–9, the opening for pouring hot water is closed by the lid 8 when the filter assembly is out of use. Where the support plate 4 lacks the lid 8 for closing the opening, it is necessary to adhere the facing edges 41 at the mouth of the filter sack. It will be seen, however, that sealing the mouth 41 of the filter sack is needless even if the support plate 4 lacks the lid 8, as long as the filter assembly is not confined in a wrapper but used as a simple filter into which a desired volume of coffee powder will be introduced at the time of use.

Where the wrapper containing the filter sack is to be made vacuous for air-tight sealing, the present invention offers another advantage that the closed end of the filter sack prevents its content from being sucked out by a vacuum while permitting air along to be removed.

Preferably, the interconnection of the opposite edges of the open sack end should be of an intensity low enough for a person to easily separate them with fingers without damaging the filter paper.

Figure 17:
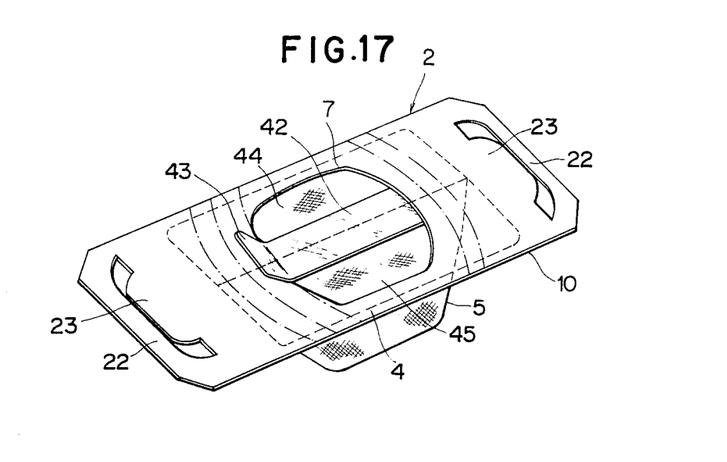
FIG. 17 is a perspective view of a filter assembly representing one method of sealing a filter sack.

As illustrated in FIG. 17, the lid member 42 for stopping the opening of the filter sack may be replaced by an elongate strip which is separably adhered to the upper surfaces of the flaps 44 and 45 along the open edges 41 of the sack which faces the opening 7. Furthermore, such a strip type lid member may include a thumb piece 43 at its one end which protrudes outward from the opening 7. The thumb piece 43 will facilitate separation of the lid member which renders the whole assembly far easier to handle.

Referring to FIGS. 18–23, a filter assembly according to another embodiment of the present invention is illustrated. Common to the support plate 4 of FIG. 10, a support plate 101 shown in FIGS. 18–23 has a pair of support legs 102 adjacent to its intermediate portion, an opening 103 for pouring hot water in the intermediate portion, and a filter sack 104 adhered to the underside of the support plate 101 with its open end faced to the opening 103.

Figure 18:
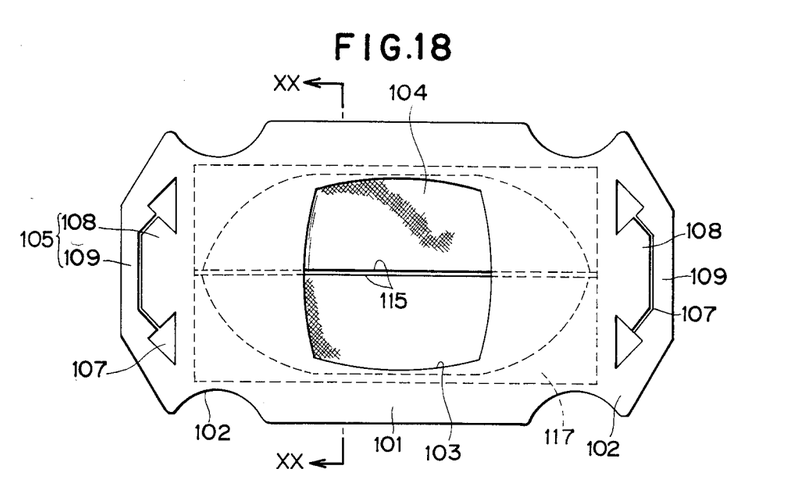
FIG. 18 is a plan view of still another embodiment of the present invention, particularly a filter sack.

The support plate 101 and support legs 102 are formed as an integral rectangular piece by cutting them from a single relatively thick paper sheet. While the support plate 101 and support legs 102 are cut from a sheet, each of the support legs 102 is formed with a nipping portion 105.

The nipping portions 105 at the individual legs 102 are adapted to fix the filter assembly in place on a receptacle 106 as will be described. In this embodiment, each nipping portion 105 is formed with a widthwise slot 107 adjacent to its end. The slot 107 is so shaped as to define an inner nipping tongue 108 and an outer nipping strip 109 which are integral with the rest of the support leg 102.

Figure 21:
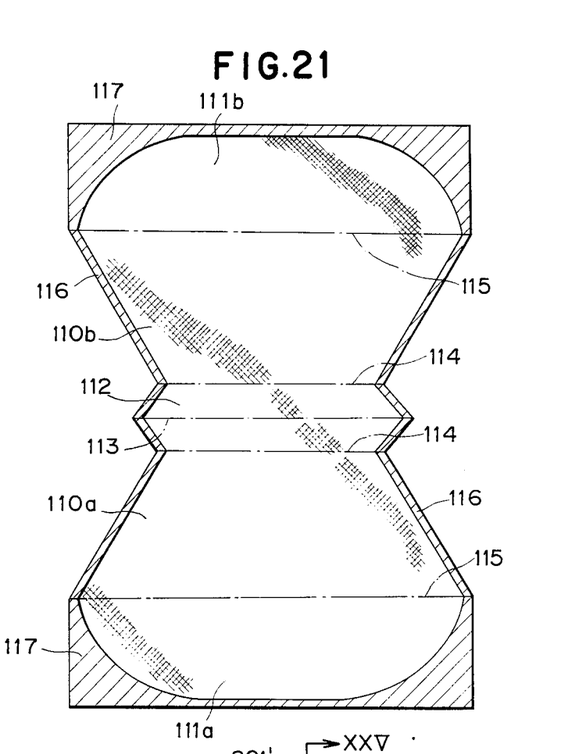
FIG. 21 is a developed view of the filter sack of FIG. 18.

Meanwhile, the filter sack 104 comprises opposite side walls 110a, 110b, flaps 111a, 111b extending in opposite directions from the individual side walls 110a, 110b, and a connecting strip 112 for connecting the side walls together.

A procedure for forming the filter sack 104 comprises double folding the sheet along the centerline 113 of the connector strip 112, turning over opposite edges 114 of the connector strip 112 in opposite directions while causing the rest to contact each other with the connector strip 112 interposed therebetween, turning over the flaps 111a and 111b outwardly along the edges 115, and bonding the interengaged side walls 110a, 110b along their side edges 116 together with side edges of the connector strip 112 which are overlaid on the former. Thus, the filter sack 104 is in the form of a flat sack whose bottom is defined by the connector strip 112. The edges 114 of the connector strip 112 define the lower edges of the side walls 110a, 110b. The upper edge 115 of each side wall 110a, 110b defines an open edge so that the flaps 111a, 111b extend from the edges of the open end of the sack.

Figure 19:
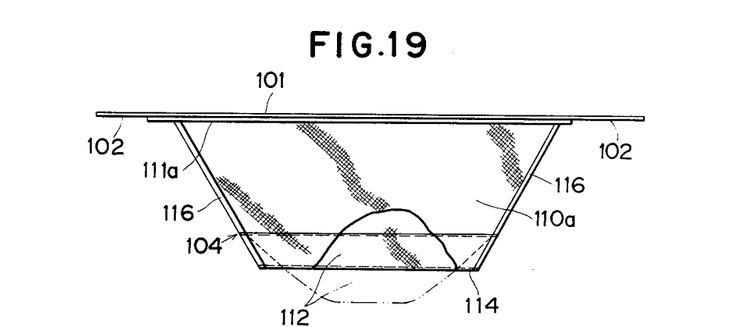
FIG. 19 is a front view of the filter assembly shown in FIG. 18.
Figure 20:
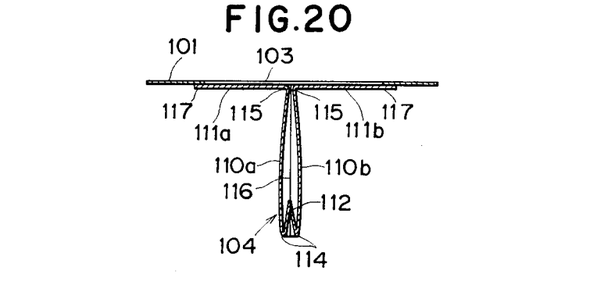
FIG. 20 is a section along line XX—XX of FIG. 18.

In assembly, the filter sack 104 is placed beneath the support plate 101 such that the adjacent upper edges 115 of the side walls 110a, 110b are aligned with the centerline of the support plate 10. The flaps 111a, 111b extending from the edges 115 are layed in face-to-face contact on the underside of the support plate 101 and those of the adjacent legs 102. In this position, the flaps 111a, 111b are adhered to the suppoort plate and its associated legs along the peripheral edges 117.

Before use, the filter assembly will have the side walls 110a, 110b of the filter sack kept in contact and in a flat position with the connector strip 112 tucked therebetween. The filter sack in this position can be bodily folded toward either one of the flaps 111a, 111b into contact with the underside of the support plate 101 in order to make the whole assembly flat.

When the support legs 102 at the opposite sides of the support plate 101 are bent downwardly relative to the intermediate part of the latter, the side walls 110a, 110b of the filter sack 104 become loosened along their upper edges 115 due to the inherent structure of the filter sack described hereinabove. This automatically opens the filter sack 104 and, at the same time, brings the opposite side edges 116 closer to each other to thereby expand the filter sack.

The thus framed filter assembly is positioned above a receptacle 106 such that the ends of the support legs 102 face the upper edge of the receptacle 106. Then, the outer nipping strip 109 at each leg 102 is caused to engage with the outer surface of the receptacle 106 and the inner nipping tongue 108 with the inner surface of the same. As viewed in FIG. 22, the strip 109 and tongue 108 nip the wall of the receptacle 106 from outside and inside whereby the filter assembly is firmly secured to the receptacle.

Figures 22, 23, 25:
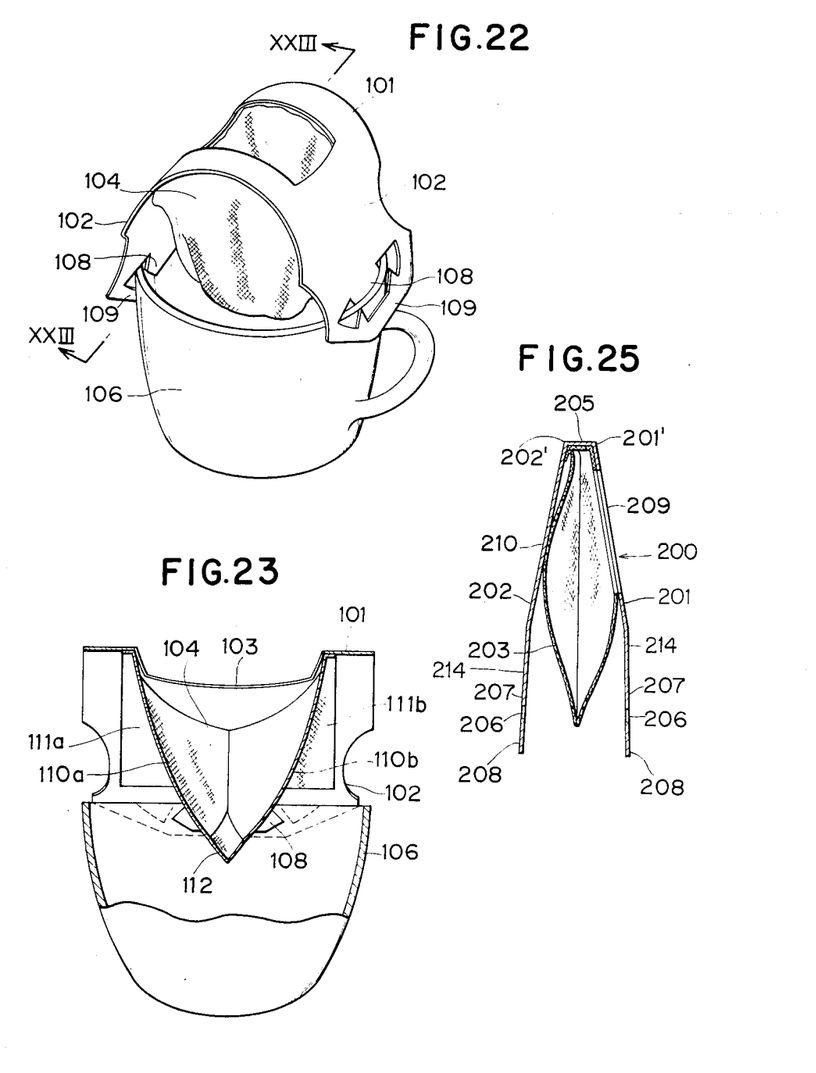
FIG. 22 is a perspective view showing the filter assembly of FIG. 18 in use.
FIG. 23 is a section along line XXIII—XXIII of FIG. 22.
FIG. 25 is a section along XXV—XXV of FIG. 24.

Thereafter, a desired volume of coffee powder and then hot water are put into the filter sack 4 which is now wide open. As seen in FIG. 23, the weight of the coffee powder and hot water causes the folded connector strip 112 to unfold and hang down from the lower edges of the side walls 110a, 110b. As a result, the filter sack 104 is deformed from the flat shape to a bowl shape.

It will be seen that the filter assembly of this embodiment can be bodily folded flat and, in use, its filter sack is automatically opened and transformed by the weight of coffee powder into a downwardly pointed cone. The tip of the cone, that is, the center of the bottom of the filter sack 104 collects all the flows of liquid coffee provided by pouring hot water into the filter sack.

The liquid coffee is therefore prevented from dropping into the areas outside the receptacle 106 from side portions of the filter sack 104. Also, the increase in the filtering area entailed by the expansion of the connector strip 112 promotes an efficient filtering operation.

While the connector strip 112 of the filter assembly may have any desired width, it must be integrally bonded to the edges 116 of the side walls 110a, 110b along its lateral edges. It is preferable that the side walls 110a, 110b keep their lower edges non-protruded from the underside of the support plate 1 or support legs 2 when in their folded position.

A further embodiment of the present invention will be described with reference to FIGS. 24–27. The filter assembly comprises a support plate 200 having inclined sections 201, 202, in its intermediate portion, and a sack of filter paper 203 for storing a coffee powder 204.

Figure 24:
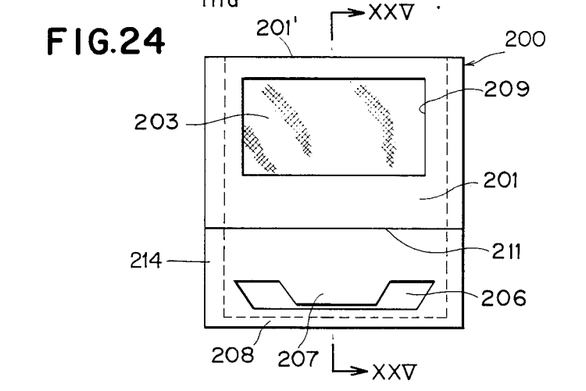
FIG. 24 is a plan view of a filter assembly according to a further embodiment of the present invention.

The pair of inclined sections 201, 202 have identical rectangular shapes and connected together along their upper edges 201', 202' by a connector strip 205. The inclined sections 201, 202 are foldable along the edges 201', 202' into a generally inverted V-section. Each inclined section 201, 202 is connected with a support plate 214 through a fold line 211, 212 and is formed with a generally U-shaped slot 206 along and adjacent to its end in the same position as the other. The U-shaped slot 206 is so configured to define an inner nipping member 207 and an outer nipping strip 208 which are integral with the rest of the support leg. The inclined section 201 is provided with a rectangular opening 209 for pouring hot water therethrough. The filter sack 203 is carried on the back of the inclined section 201 with the opening 209.

The filter sack 203 is adhered to and suspended from the inclined section 201 along the edges which define an open end or mouth of the filter sack 203, in such a manner as to surround the opening 209. The whole filter sack 203 is acccommodated in the double folded support plate 200. The filter sack 203 is also locally adhered as at 210 to the back of the other inclined section 202 and, consequently, it is suspended from both of the inclined sections 201, 202.

The fold lines 211, 212 extend transversely between the intermediate portion of the support plate 200 and the opposite support legs 214, respectively.

When the filter assembly thus constructed is out of use, it is handled in the flat position with the support plate 200 folded into two and the filter sack 203 held inside the support plate 200. In use, the support plate 200 is unfolded and its support legs 214 are fixedly mounted on the upper edge of a coffee cup of like receptacle.

Figure 26:
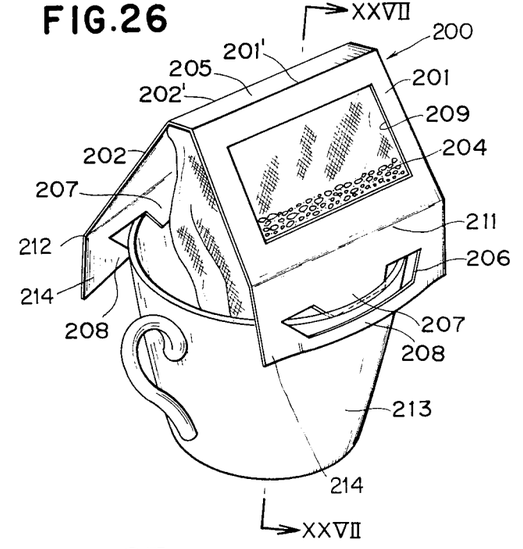
FIG. 26 shows the filter assembly of FIG. 24 in use.
Figure 27:
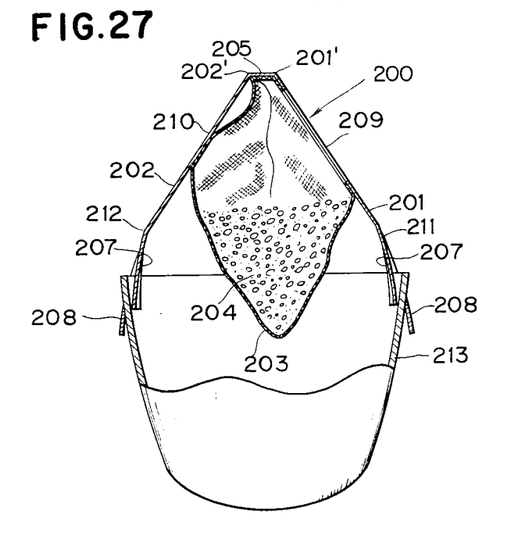
FIG. 27 is a section along line XXVII—XXVII of FIG. 26.

A manner of use of such a filter assembly is demonstrated in FIGS. 26 and 27. When the support plate 200 is unfolded, the filter sack 203 is pulled at the adhered spot 210 to automatically expand itself. Located above a receptacle 213, the filter assembly first has its nipping strip 208 engaged with the outer edge surface of the receptacle 213 and then its nipping tongue 207 thrusted into the receptacle. In this condition, the filter assembly fixed in place on the receptacle 213 with the tongue 207 and strip 208 nipping the receptacle from inside and outside, respectively. Subsequently, a desired amount of coffee powder 204 and then hot water are successively poured into the filter sack 203 to extract liquid coffee directly into the receptacle 213. The distance between the now opened support legs is determined as desired depending on the diameter of the receptacle 213. To ensure more stable position of the filter assembly on the receptacle 213, the support plate 200 made up of the inclined sections 201, 202 and legs 214 may be bent along their fold lines 211, 212 until the corresponding nipping members 207 and 208 extend as straight as possible in the rising direction of the edge of the receptacle 213.

The filter assembly of the embodiment described above is quite handly and readily storable since it can be foldable flat when out of use. The filter assembly in use can be easily built on a receptacle since it stands automatically thereon only if the support plate is unfolded to a specific receptacle size and then the inner and outer nipping members 207, 208 are positioned to nip the receptacle therebetween.

What is claimed is:

1. A filter assembly which is adapted to be mounted on a receptacle, comprising: a sheet in the form of a resilient, manually deformable generally rectangualr support plate having transverse end edges and longitudinal side edges and an intermediate portion defining an opening therein for pouring hot water therethrough, said support plate including a grasping means for securely mounting said support plate on the receptacle, said grasping means including a generally U-shaped slot therein, adjacent to but spaced from a support plate end edge said slot having a bottom portion extending parallel to the support plate end edge and a pair of wing portions each extending substantially toward said intermediate portion; said grasping means including an outer nipping strip formed by that portion of said support plate located between said end edge and said slot bottom portion and being continuous from one support plate side edge to the other whereby said outer nipping strip is continuous and includes essentially the entire support plate end edge, said grasping means further including an inner nipping tongue separated from said outer nipping strip by said slot, said inner nipping tongue being shaped to conform with the shape of said slot and being co-planar with said outer nipping strip when said support plate is in a planar configuration so that when said outer nipping strip is positioned on one side of the receptacle and said inner nipping tongue is positioned on another side of the receptacle, the resilient nature of said support plate tends to force said inner nipping tongue against the receptacle and tends to force said outer nipping strip against the receptacle at essentially all locations adjacent to said inner nipping tongue whereby said outer nipping strip cooperates with essentially all of said inner nipping tongue to securely grasp the receptacle; and a sack of filter paper covering the opening in the intermediate portion.

2. A filter assembly according to claim 1, wherein said nipping tongue is formed with a pair of lugs therein.

3. A filter assembly according to claim 2, wherein each lug is formed with a cut extending in an outside base end thereof.

4. A filter assembly according to claim 3, wherein said cut extends laterally.

5. A filter assembly according to claim 1 wherein said sack of filter paper is mounted on said support plate and covers part of said support plate to increase the resiliency of said support plate.

6. A filter assembly according to claim 5 wherein said U-shaped slot wing portions include terminal ends extending essentially parallel to said support plate end edge.

7. A filter assembly according to claim 1 further including a support plate folding means in said support plate adjacent to said opening for configuring said support plate to be accommodated in a plurality of different sized receptacles.

8. A filter assembly according to claim 7 wherein said support plate folding means includes a plurality of arcuate foldlines.

9. A filter assembly according to claim 1 wherein said support plate includes a pair of support leg portions integral with said intermediate portion and having free ends which form said support plate end edges.

10. A filter assembly as claimed in claim 1, in which the filter sack comprises a flat sack open at one end formed by double folding a sheet of filter paper and adhering the resultant two parts along overlying opposite side edges, flaps extending outward from the facing edges of the filter sack which defines the open end, the open edges of the filter sack being aligned with a fold line along which the support plate is foldable into two, the flaps being adhered to one surface of the support plate along peripheral edges thereof.

11. A filter assembly as claimed in claim 10, in which opposite side walls formed by double folding the support plate are connected together along the lower edges by a connecting strip which is folded into two.

12. A filter assembly as claimed in claim 1, in which the support plate is foldable in two along a fold line which is coincident with the longitudinal centerline.

13. A filter assembly as claimed in claim 1, in which the support plate is foldable in two along a transverse fold line which is perpendicular to the longitudinal centerline.

14. A filter assembly as claimed in claim 13, in which the opening for pouring hot water is positioned on either side of the transverse fold line.

15. A filter assembly as claimed in claim 1, in which the opening for pouring hot water is defined by four arcs.

* * * * *